United States Patent
Hsu

(10) Patent No.: US 12,128,632 B2
(45) Date of Patent: Oct. 29, 2024

(54) 3D PRINTING APPARATUS

(71) Applicant: Young Optics Inc., Hsinchu (TW)

(72) Inventor: Ming-Fu Hsu, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 17/864,391

(22) Filed: Jul. 13, 2022

(65) Prior Publication Data

US 2023/0013059 A1    Jan. 19, 2023

(30) Foreign Application Priority Data

Jul. 16, 2021  (TW) .................................. 110126185

(51) Int. Cl.
| | | |
|---|---|---|
| *B29C 64/393* | (2017.01) | |
| *B29C 64/124* | (2017.01) | |
| *B29C 64/245* | (2017.01) | |
| *B29C 64/20* | (2017.01) | |
| *B29C 64/386* | (2017.01) | |
| *B33Y 10/00* | (2015.01) | |
| *B33Y 30/00* | (2015.01) | |
| *B33Y 50/00* | (2015.01) | |
| *B33Y 50/02* | (2015.01) | |

(52) U.S. Cl.
CPC .......... *B29C 64/393* (2017.08); *B29C 64/124* (2017.08); *B29C 64/245* (2017.08); *B29C 64/20* (2017.08); *B29C 64/386* (2017.08); *B33Y 10/00* (2014.12); *B33Y 30/00* (2014.12); *B33Y 50/00* (2014.12); *B33Y 50/02* (2014.12)

(58) Field of Classification Search
CPC ... B29C 64/393; B29C 64/124; B29C 64/245; B29C 64/386; B29C 64/20; B33Y 10/00; B33Y 30/00; B33Y 50/00; B33Y 50/02
USPC ......................................................... 264/40.1
See application file for complete search history.

(56) References Cited

U.S. PATENT DOCUMENTS

| | | | |
|---|---|---|---|
| 2019/0077085 A1* | 3/2019 | Jau .................. | B29C 64/135 |
| 2021/0031458 A1* | 2/2021 | Ong .................. | B29C 64/393 |

FOREIGN PATENT DOCUMENTS

| | | |
|---|---|---|
| CN | 204123684 | 1/2015 |
| CN | 105365214 | 8/2017 |
| CN | 107009617 | 8/2017 |
| CN | 109501251 | 3/2019 |

\* cited by examiner

*Primary Examiner* — Galen H Hauth
*Assistant Examiner* — Lawrence D. Hohenbrink, Jr.
(74) *Attorney, Agent, or Firm* — JCIPRNET

(57) ABSTRACT

A 3D printing apparatus including a tank, a print platform, a motor, a force sensor, and a controller is provided. The tank is configured to accommodate a photocurable resin. The print platform is arranged adjacent to the tank. The motor is mechanically connected to the print platform. The motor is configured to drive the print platform to move. The force sensor includes a position encoder. The controller is electrically connected to the force sensor and the motor. The controller is configured to confirm whether the print platform is configured to reach a target position through a value of the position encoder.

9 Claims, 2 Drawing Sheets

3D PRINTING APPARATUS

CROSS-REFERENCE TO RELATED APPLICATION

This application claims the priority benefit of Taiwanese application no. 110126185, filed on Jul. 16, 2021. The entirety of the above-mentioned patent application is hereby incorporated by reference herein and made a part of this specification.

BACKGROUND

Technical Field

The disclosure relates to a printing apparatus, and in particular, to a 3D printing apparatus.

Description of Related Art

In three-dimensional (3D) printing, layer-by-layer stacking is performed to form the final object. However, after the layers are cured, every layer has to be peeled off from the release film before the next layer is processed. When the print platform moves upwards and downwards, the pressure peak value may appear when the print platform descends, presses on and contacts the liquid surface, and the pressure tends to become stable after the adhesive is discharged. When the print platform ascends, the pulling force peak appears at the moment when the printing object is separated from the photocurable resin.

In the technology above, the issue of release force when the release film is peeled off from the object after curing and the issue of adhesive-discharging when the print platform moves to the printing position may both occur. To overcome the issue of release force and to achieve successful printing, in the related art, the motor speed is lowered and the waiting time is increased. However, a decrease in motor speed and an increase in waiting time may lead to low printing efficiency. Apart from that, in the case that different adhesive materials or release films are used, most of the time, the motor speeds and the waiting time are required to be adjusted according to different materials. It thus can be seen that the printing speed is lowered, and an inconvenient using experience is provided. On the other hand, if the printing speed is excessively accelerated, printing may not be successfully completed and may fail. Therefore, it is observed that there is a trade-off between fast printing speed and slow printing speed in the related art.

SUMMARY

The disclosure is directed to a 3D printing apparatus capable of providing an increased printing speed, achieving successful printing, and delivering a favorable user experience.

The 3D printing apparatus of the disclosure includes a tank, a print platform, a motor, a force sensor, and a controller. The tank is configured to accommodate a photocurable resin. The print platform is disposed adjacent to the tank. The motor is mechanically connected to the print platform. The motor is configured to drive the print platform to move. The force sensor includes a position encoder. The controller is electrically connected to the force sensor and the motor. The controller is configured to confirm whether the print platform is configured to reach a target position through a value of the position encoder.

The 3D printing apparatus of the disclosure includes a tank, a print platform, a motor, a load sensor, and a controller. The tank is configured to accommodate a photocurable resin. The print platform is configured to extend into the tank. The motor is forcibly connected to the print platform. The load sensor is configured to generate a first force signal. The pressure sensor is configured to generate a second force signal. The controller is electrically connected to the load sensor, the pressure sensor and the motor. The controller is configured to receive the first force signal and/or the second force signal and output a control signal in response to the force signal to change an output of the motor.

In an embodiment of the disclosure, the force sensor is a load sensor, a torsion sensor, or a pressure sensor.

In an embodiment of the disclosure, the print platform is disposed above the tank.

In an embodiment of the disclosure, the force sensor or the load sensor and the pressure sensor are disposed in the motor.

In an embodiment of the disclosure, the force sensor or the load sensor and the pressure sensor are connected to the motor.

In an embodiment of the disclosure, the motor is an electric motor.

In an embodiment of the disclosure, the 3D printing apparatus further includes a transparent plate and a release film. The transparent plate is disposed in the tank. The release film is attached to the transparent plate. A printing object is connected to the release film.

In an embodiment of the disclosure, when the printing object is configured to leave the photocurable resin, the printing object is separated from the release film.

In an embodiment of the disclosure, the force sensor or the load sensor and the pressure sensor include a position encoder.

In an embodiment of the disclosure, the force sensor or the load sensor and the pressure sensor are connected to the motor and is configured to sense a force and obtain a sensing value. The controller is configured to receive the sensing value and output a feedback value to the motor after comparing the sensing value with an expected value.

In an embodiment of the disclosure, if the sensing value is greater than the expected value, the controller is configured to lower the feedback value. If the sensing value is less than the expected value, the controller is configured to increase the feedback value.

Based on the above, in the embodiments of the disclosure, the controller may output the control signal in response to the force signal to change the power and the speed outputted by the motor. Therefore, the printing speed is increased, successful printing is achieved, and favorable user experience is provided.

In order to make the aforementioned features and advantages of the disclosure more comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
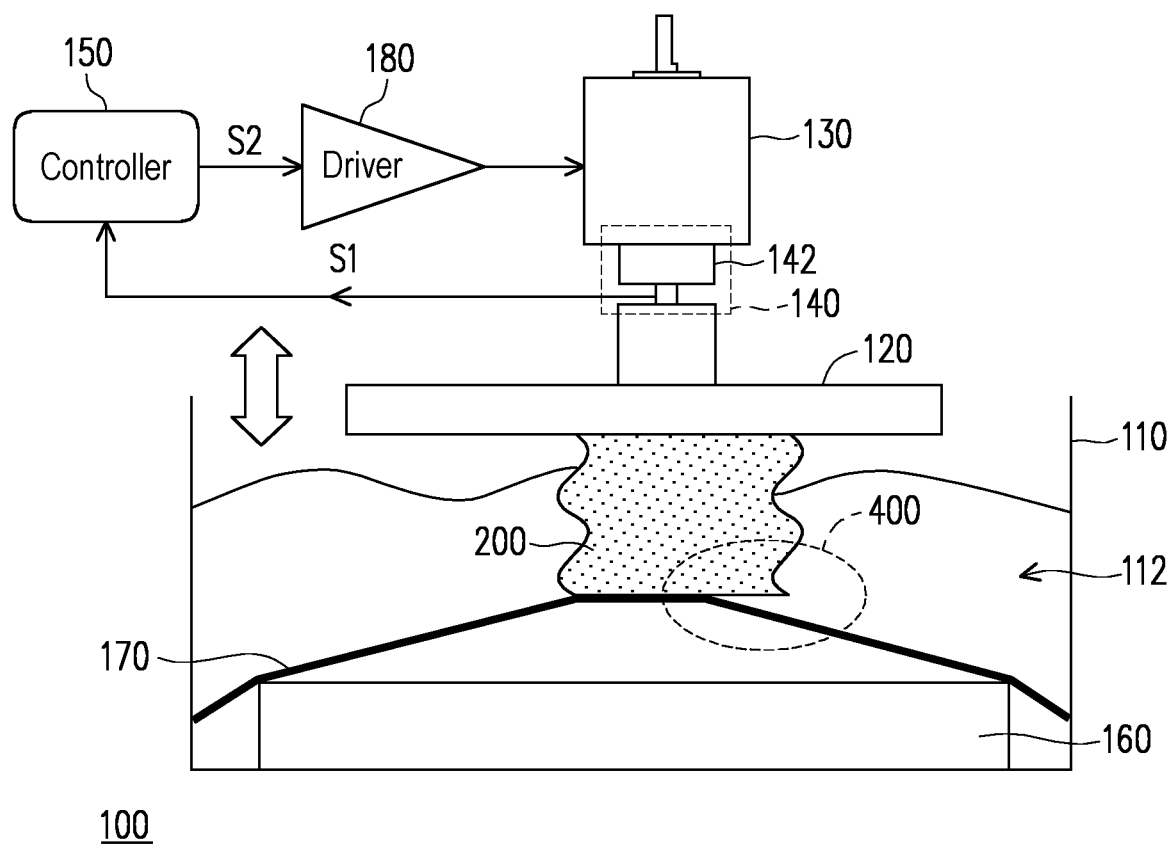
FIG. 1 is a schematic view illustrating a 3D printing apparatus according to an embodiment of the disclosure.
Figure 2:
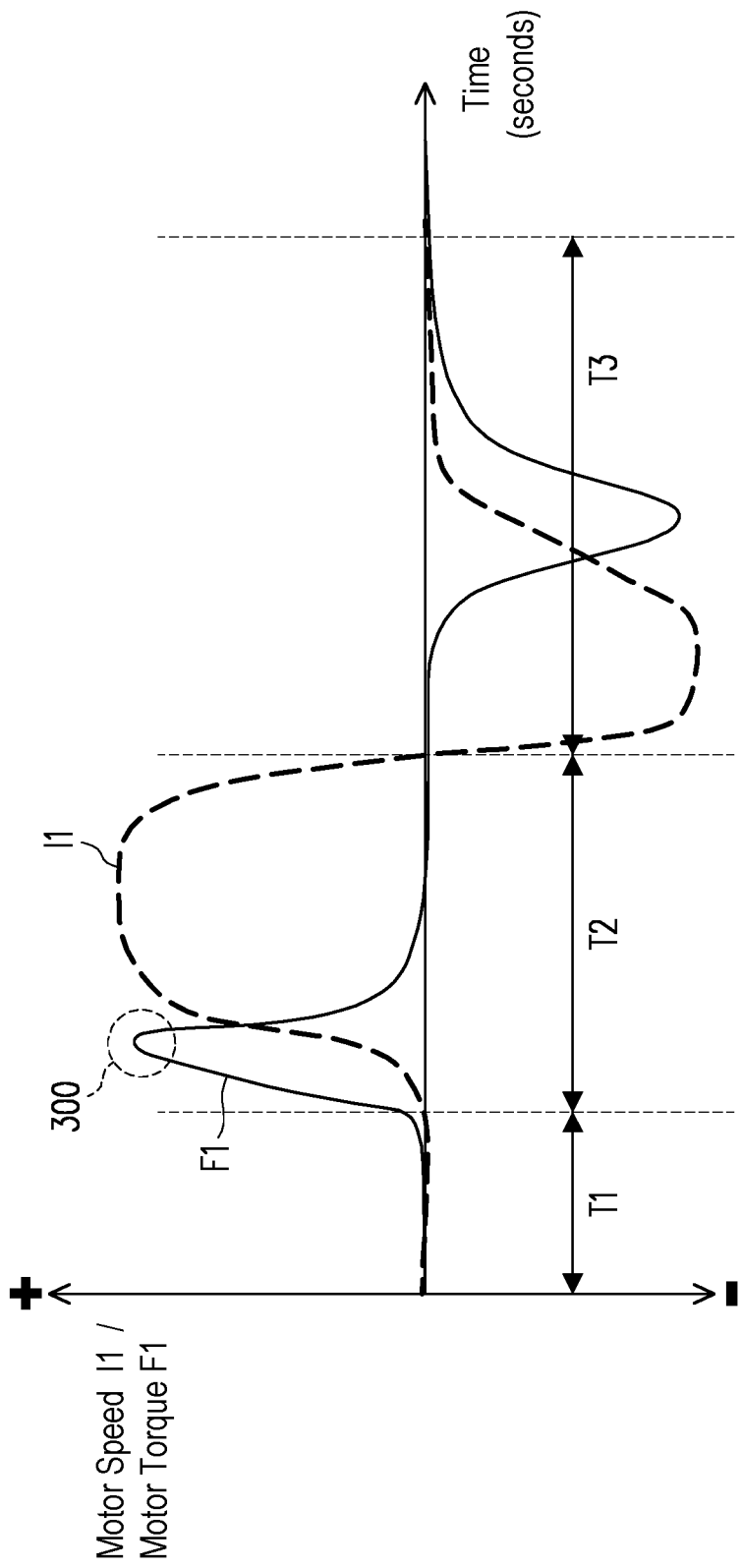
FIG. 2 is a schematic graph of waveforms illustrating motor torque and a motor driving speed of the 3D printing apparatus in FIG. 1 according to an embodiment of the disclosure.

Referring to FIG. 1 and FIG. 2, a 3D printing apparatus 100 of this embodiment includes a tank 110, a print platform 120, a motor 130, a force sensor 140, a controller 150, a transparent plate 160, a release film 170, and a driver 180.

To be specific, the tank 110 is configured to accommodate a photocurable resin 112, such as a photosensitive resin. The print platform 120 is disposed adjacent to the tank 110, such as being disposed above the tank 110. The print platform 120 is configured to extend into the tank 110 to pull a printing model out of the photocurable resin 112 and form a printing object 200. The transparent plate 160 is disposed in the tank 110. The release film 170 is detachably attached to the transparent plate 160. The printing object 200 is connected to the release film 170. When the printing object 200 leaves the photocurable resin 112, the printing object 200 is separated from the release film 170, as shown at a release area 400 in FIG. 1.

In this embodiment, the transparent plate 160 is, for example, a transparent platform, and a material thereof is glass. A light source device (not shown) may be disposed below the transparent plate 160. The light source device is disposed below the transparent plate 160 to provide a molding light beam. The molding light beam passes through the transparent plate 160 and the release film 170 to illuminate the tank 110 and to cause the photocurable resin 112 to cure.

In addition, the motor 130 is mechanically connected to the print platform 120. The motor 130 is, for example, an electric motor. The motor 130 is configured to drive the print platform 120 to move. Hence, the motor 130 is forcibly connected to the print platform 120. The controller 150 is electrically connected to the force sensor 140 and the motor 130. The force sensor 140 is, for example, a load sensor, a torsion sensor, or a pressure sensor. With regard to the description of the embodiment, the force sensor 104 is a load sensor. The load sensor 140 is configured to generate a force signal S1 to the controller 150. The controller 150 receives the force signal S1 and outputs a control signal S2 in response to the force signal S1 to the driver 180 to change power and a speed outputted by the motor 130.

Specifically, the driver 180 is configured to output a driving current to drive the motor 130 to move and change a speed of the motor 130. Therefore, the motor 130 may output the power and the speed to drive the print platform 120 to move upwards and downwards. In this embodiment, the motor 130 is, for example, an electric motor. The driver 180 may change a speed I1 of the electric motor in FIG. 2 according to the control signal S2 received by the controller 150 to change a moving speed of the print platform 120. The load sensor 140 is connected to the motor 130. In an embodiment, the load sensor 140 may be disposed in the motor 130.

In this embodiment, the load sensor 140 includes a position encoder 142 which is configured to detect a position of the print platform 120. For example, the motor 130 drives the print platform 120 to perform 3D printing. After a target position of the print platform 120 is set, the controller 150 obtains a current position of the print platform 120 by reading a value of the position encoder 142. When a position of the print platform 120 does not reach the target position, the controller 150 may continue to control the print platform 120 to move until the print platform 120 reaches the target position.

As shown in FIG. 2, in a 3D printing process, the process may mainly be divided into an exposure phase T1, a release phase T2, and an adhesive-discharging phase T3. FIG. 2 shows changes of motor torque F1 (unit: kgf-m) and a motor speed I1 (unit: pulse per second, PPS) in these different phases. When the print platform 120 ascends, a pulling force peak 300 of a release force appears at the moment when the printing object 200 is separated from the photocurable resin 112. In this embodiment, the controller 150 may confirm whether the print platform 120 reaches the target position through position information without adding the waiting time waiting for completion of adhesive discharging. Furthermore, the difference between different photocurable resins 112 (i.e., adhesive materials) may be overcome.

In this embodiment, the load sensor 140 is connected to the motor 130 and is configured to sense a force and obtain a sensing value (i.e., the force signal S1). The controller 150 is configured to receive the sensing value and output a feedback value (i.e., the control signal S2) to the motor 130 after comparing the sensing value with an expected value. In this embodiment, the expected value may be a fixed value or an ideal curve value (e.g., ideal motor torque F1) matched with a release state. If the sensing value is greater than the expected value, the controller 150 lowers the feedback value. If the sensing value is less than the expected value, the controller 150 increases the feedback value. That is, if a force sensed by the load sensor 140 is greater than the expected value, the controller 150 controls the driver 180 to lower an outputted driving speed to decrease the moving speeds of the motor 130 and the print platform 120. Conversely, if the force sensed by the load sensor 140 is less than the expected value, the controller 150 controls the driver 180 to increase the outputted driving speed to increase the moving speeds of the motor 130 and the print platform 120.

In view of the foregoing, in the embodiments of the disclosure, the magnitude of the driving current and the driving speed of the motor are changed by using the controller, and in this way, the release force is less affected by the difference in photocurable resins. Further, the controller reads the position value of the position encoder, and that the magnitude of the release force may thus be detected. If a strong release force is required, the driving current is increased, and if a weak release force is required, the driving current is decreased. The controller may determine whether a release process is completed according to the magnitude of the release force. The next layer may be printed without extra waiting time waiting for the completion of the release process. Moreover, the moving speed of the motor may also be determined based on the magnitude of the release force. If the release force is strong, the speed of the motor is decreased, and if the release force is weak, the speed of the motor is increased. In this way, successful printing may be achieved, and the inconvenience of the need of changing motor speed for different photocurable resins is also avoided. Therefore, the 3D printing apparatus provided by the embodiments of the disclosure in capable of providing increased printing speed, achieving successful printing, and delivering favorable user experience.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A 3D printing apparatus, comprising:
a tank configured to accommodate a photocurable resin;
a print platform capable of extend into the tank;
a motor connected to the print platform;
a load sensor configured to generate a first force signal;
a pressure sensor configured to generate a second force signal; and
a controller electrically connected to the load sensor, the pressure sensor and the motor, and configured to receive the first force signal and/or the second force signal and output a control signal in response to the first force signal and/or the second force signal to change an output of the motor, wherein the load sensor comprises a position encoder.

2. The 3D printing apparatus according to claim 1, wherein the print platform is disposed above the tank.

3. The 3D printing apparatus according to claim 1, wherein the load sensor is disposed in the motor.

4. The 3D printing apparatus according to claim 1, wherein the load sensor and the pressure sensor are connected to the motor.

5. The 3D printing apparatus according to claim 1, wherein the motor is an electric motor.

6. The 3D printing apparatus according to claim 1, further comprising:
a transparent plate disposed in the tank; and
a release film attached to the transparent plate, wherein a printing object is connected to the release film.

7. The 3D printing apparatus according to claim 6, wherein when the printing object is configured to leave the photocurable resin, the printing object is separated from the release film.

8. The 3D printing apparatus according to claim 1, wherein
the load sensor and the pressure sensor are connected to the motor and configured to sense a force and obtain a sensing value, and
the controller is configured to receive the sensing value and output a feedback value to the motor after comparing the sensing value with an expected value.

9. The 3D printing apparatus according to claim 8, wherein the controller is configured to lower the feedback value if the sensing value is greater than the expected value, and the controller is configured to increase the feedback value if the sensing value is less than the expected value.

* * * * *